US006673856B1

(12) United States Patent
Mentink (10) Patent No.: US 6,673,856 B1
(45) Date of Patent: Jan. 6, 2004

(54) ALDITOL ACETAL COMPOSITION AND ITS USE IN PLASTIC AND GELLED MATERIALS

(75) Inventor: Léon Mentink, Lille (FR)

(73) Assignee: Roquette Freres, Lestrem (FR)

( * ) Notice: Subject to any disclaimer, the term of this patent is extended or adjusted under 35 U.S.C. 154(b) by 0 days.

(21) Appl. No.: 09/230,795

(22) PCT Filed: Dec. 9, 1998

(86) PCT No.: PCT/FR98/02669

§ 371 (c)(1),
(2), (4) Date: Sep. 22, 1999

(87) PCT Pub. No.: WO99/33776

PCT Pub. Date: Jul. 8, 1999

(30) Foreign Application Priority Data

Dec. 23, 1997 (FR) ............................................. 97 16327

(51) Int. Cl.⁷ .............................. C08J 5/10; C08K 5/15
(52) U.S. Cl. ..................... 524/110; 524/376; 524/377; 568/428; 568/435
(58) Field of Search .......................... 549/364; 524/27, 524/110, 376, 377; 568/852, 853, 428, 435

(56) References Cited

U.S. PATENT DOCUMENTS

| 4,562,265 A | | 12/1985 | Machell |
| 5,023,354 A | | 6/1991 | Salome et al. |
| 5,346,694 A | * | 9/1994 | Juneja .......................... 424/66 |
| 5,696,186 A | * | 12/1997 | Videau .......................... 524/48 |

FOREIGN PATENT DOCUMENTS

| EP | 0 068 773 | 2/1986 |
| EP | 0 286 522 | 10/1988 |
| EP | 0 361 087 | 4/1990 |
| EP | 0 384 472 | 8/1990 |
| EP | 0 421 634 | 4/1991 |
| EP | 0 522 558 | 1/1993 |
| EP | 0 569 198 | 11/1993 |
| EP | 0 651 006 | 5/1995 |
| JP | 60-101131 | 6/1985 |
| JP | 62-253646 | 11/1987 |
| JP | 4082890 | 3/1992 |
| JP | 90-48783 | 2/1997 |
| JP | 9-286788 | 11/1997 |

OTHER PUBLICATIONS

"The Merck Index", 10$^{th}$ Edition, 1983, pp. 1358–1360 and 1437.
"Vitamin E : Biological and Clinical Aspects of Topical Treatment" by K. Furuse, Cosmetics & Toiletries, vol. 102, Nov. 1987, pp; 99–115.

* cited by examiner

Primary Examiner—James J. Seidleck
Assistant Examiner—U. K. Rajguru
(74) Attorney, Agent, or Firm—Sturm & Fix LLP (57) ABSTRACT

The present invention relates to improved alditol acetal compositions, in particular 1,3-2,4-di(benzylidene) sorbitol (DBS) or one of its alkylated derivatives.

The improvement in these compositions is expressed in particular in terms of flow behavior and/or thermal stability. It is obtained by combining the alditol acetal with an additive selected from tocopherols, polyols and certain of their respective derivatives.

These additives may act as binding or densifying agents and/or stabilizing agents or odor maskers.

The alditol acetal and additive are advantageously combined by cold mixing, followed by granulation or compaction, also cold.

The compositions of the invention, for example based on DBS or the methylated derivatives of DBS, are in the form of densified or compacted powders, granules, pellets, pastilles or extrudates.

They are used in particular for preparing plastic or jellified materials or additives for these types of materials.

31 Claims, 3 Drawing Sheets

Figure 1:
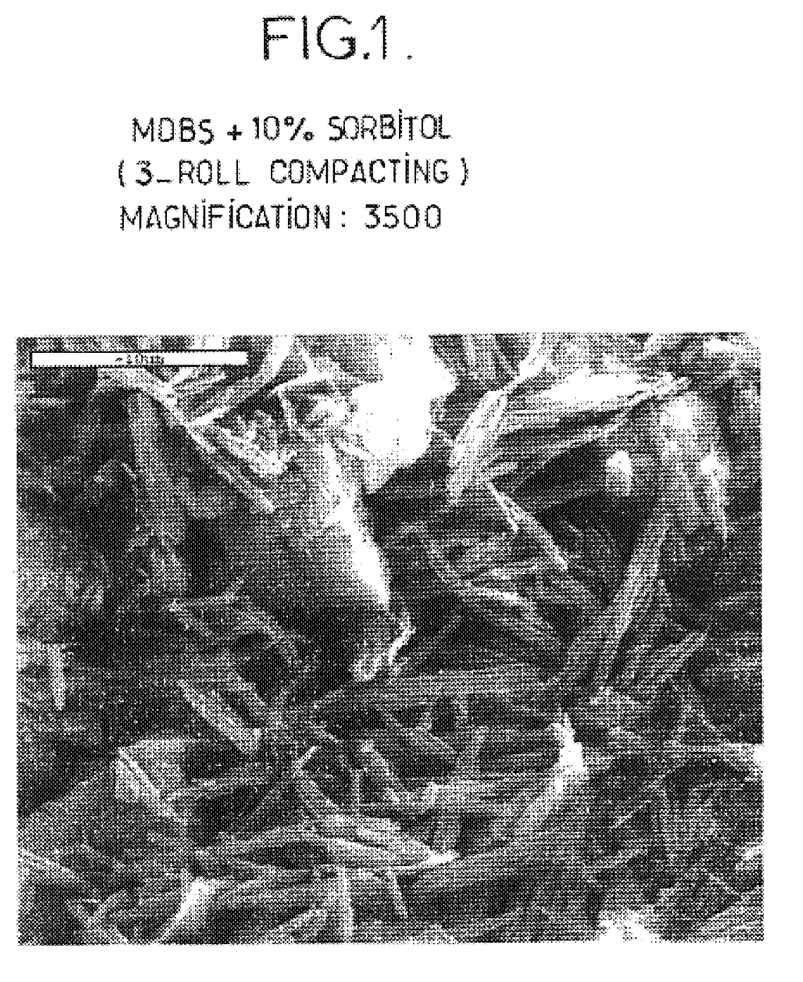
Figure 2:
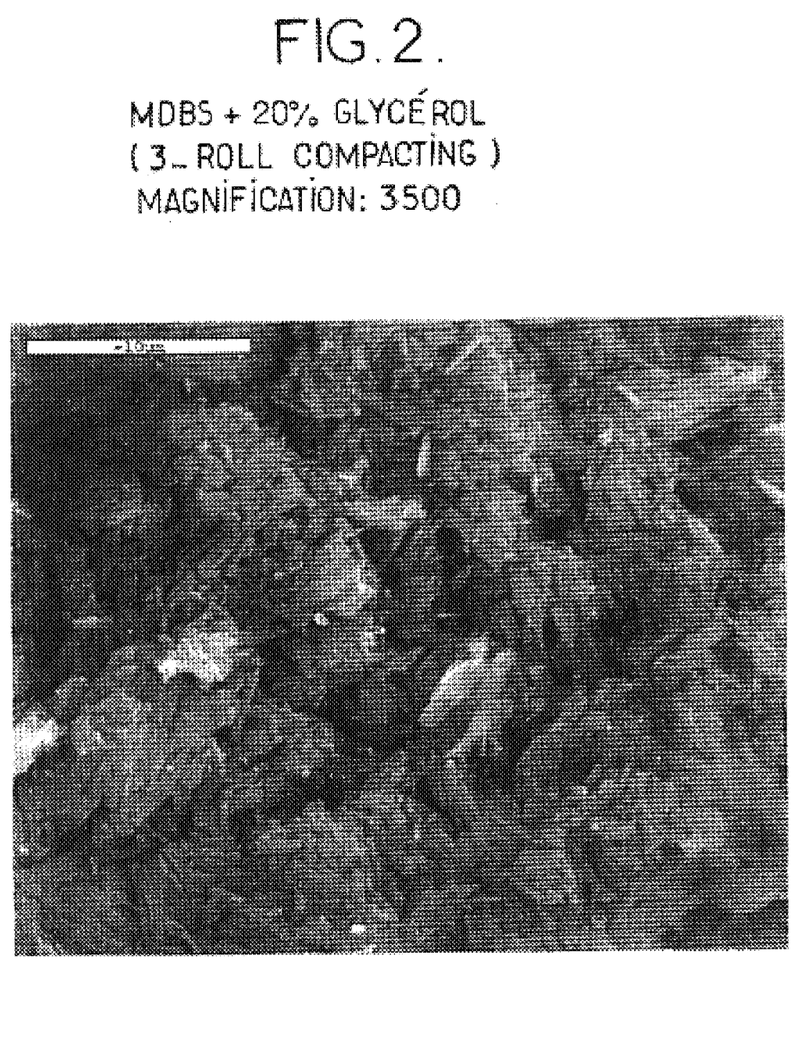
Figure 3:
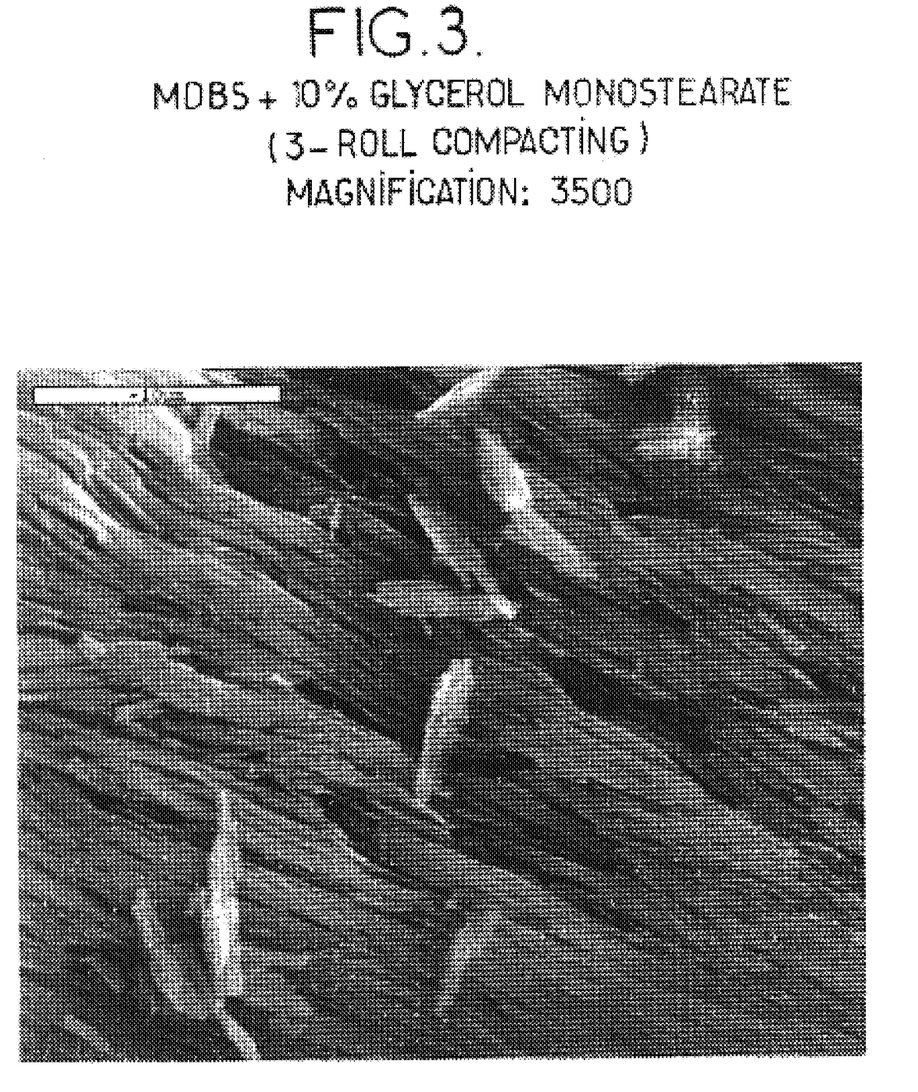

FIG.1.

MDBS + 10% SORBITOL
(3-ROLL COMPACTING)
MAGNIFICATION: 3500

FIG.2.

MDBS + 20% GLYCÉROL
(3_ROLL COMPACTING)
MAGNIFICATION: 3500

FIG. 3.
MDBS + 10% GLYCEROL MONOSTEARATE
(3-ROLL COMPACTING)
MAGNIFICATION: 3500

ALDITOL ACETAL COMPOSITION AND ITS USE IN PLASTIC AND GELLED MATERIALS

FIELD OF THE INVENTION

The present invention relates to an improved composition of alditol acetal, in particular dibenzylidene sorbitol or one of its derivatives.

It relates in particular to a new powdery composition of an alkylated alditol diacetal.

It is also intended to provide a new process for improving the flow behavior and/or stability of alditol acetal compositions.

Finally the present invention also relates to use of said compositions for preparing plastics materials or jellified materials or additives intended for use in said materials.

BACKGROUND OF THE INVENTION

It is well known that alditol acetals such as dibenzylidene sorbitol and its derivatives may be used as additives, in particular as nucleating agents or clarifying agents for plastics materials such as polyolefins.

These products are also used as agents for jellifying or modifying the viscosity of a variety of materials such as compositions for cosmetic or pharmaceutical use, adhesive compositions or paints. These compositions may also be shaped within other articles such as rods or sticks of glue or cosmetic materials, for example deodorants or air fresheners.

One of the main disadvantages associated with the industrial use of alditol acetals such as dibenzylidene sorbitol and its derivatives relates to the poor flow behavior of these products. This is due, at least in part, to the generally very powdery and very tacky character of these products. This produces problems during industrial operations such as transporting, crushing, bagging, metering, mixing, storing, cleansing, etc.

In particular, alditol acetal powders readily form "domes" in storage tanks and/or transport piping. This prevents or impedes the routing, metering, and/or evacuation of these products when using feeding hoppers and metering systems in industrial units, for example units intended for the preparation of plastics materials or additives for plastics materials.

"Plastics materials" are understood to mean in particular polyolefins, especially all polymers based on propylene and/or ethylene, polyamides, thermoplastic polyesters, vinyl resins, acrylic resins and mixtures of these.

This flow behavior problem of powdery forms of alditol acetals has not yet been resolved in a practical industrial manner, other than by manufacturers and/or users of these products using modified devices such as special pneumatic feeding systems or PTFE-lined hoppers.

In addition to the fact that these types of devIces may be costly and/or complex, they do not always prevent, the "dome" phenomena mentioned above or at the very least fouling problems which appear in hoppers, metering systems or, further downstream, screw conveyors supplying mixtures to preparation units for plastics or jellified materials.

Moreover, even within compositions of materials into which they can be introduced and metered in a satisfactory manner, alditol acetals may exhibit a poor dispersing capacity. This phenomenon can produce, in particular in plastics and jellified materials, a heterogeneity or some degree of degradation of the final characteristics of said materials (general appearance or organoleptic, optical, mechanical characteristics, etc).

A variety of technologies has been proposed in order to alleviate the problems mentioned above of Door dispersibility of alditol acetals, in particular of dibenzylidene sorbitol and its derivatives. For example, Japanese patent JP 60-101131 describes drying then finely crushing an alditol diacetal previously treated with terephthalic acid in the presence of an anionic surfactant.

Lyophilisation of a gel of alditol diacetal in a solvent has also been recommended, as disclosed in Japanese patent JP 62-253646. The lyophilized product thus obtained has a low "after tamping down" density, that is the density is in the order of 100 g/l, and is always significantly less (by a factor of about 3) than that of the initial alditol diacetal.

More recently, patent EP 569 198 has disclosed ultrafine crushing of alditol diacetals on modified devices, for example combining a fluidized bed and a high speed turbine, in order to obtain products with an average particle size which is especially small, that is at most 15 $\mu$m and preferably less than 6 $\mu$m.

On reading example 2 of the above document it seems that this type of ultrafine crushing applied to dibenzylidene sorbitol with the brand name "MILLAD® 3905" is accompanied by a very significant reduction (by a factor of about 3.3) of the "after tamping down" density ("packed bulk density") of the product.

Still more recently, other technologies have been recommended with the objective of improving the dispersibility of alditol diacetals, in particular:

the preparation, by drying/spraying, of a fine powder based on a mixture of an alditol diacetal and a special phosphite, said mixture having been previously solubilized in a solvent (patent EP 651 006), or forced drying and crushing, in particular in an instantaneous dryer, of damp alditol diacetal, the dried/crushed product obtained having a very low residual water content (0.01%) and an apparent density in the order of about 200 g/l (patent JP 06-048783).

The result is that the methods recommended for guaranteeing good dispersibility of alditol acetals within plastics materials etc, are generally complex and/or costly or even dangerous, in particular due to the fact that they involve the use of specific drying equipment, crushing equipment and/or solvents.

In addition, as indicated above, these methods generally have the objective of or the effect of significantly reducing the density of alditol acetals, which increases their dusty character and dangerousness (risks of explosion and inhalation) and worsens their ability to flow freely.

Another disadvantage associated with the industrial use of alditol acetals, or at least in some of them such as, for example, certain alkylated or halogenated derivatives of dibenzylidene sorbitol, originates in the unstable character of these products. This instability is exhibited in particular by odiferous problems and by a reduction in effectiveness under some conditions of use.

These problems may be detected organoleptically in the initial product, i.e. even before any processing or special use of the product.

They may be detected organoleptically only when the alditol acetal is actually used in an industrial process, for example during thermoforming of a plastics material in which alditol acetal has been incorporated.

This type of thermal treatment may, inter alia, generate, encourage or amplify decomposition phenomena, in particular hydrolysis and/or sublimation of the alditol acetal and the emission of undesirable odors, in particular of an aldehyde type.

This is particularly undesirable in the case of materials intended to be used in contact with foodstuffs, pharmaceuticals or cosmetics.

This instability, in particular thermal instability, of alditol acetals is generally accompanied by a reduction in their effectiveness as nucleating or clarifying agents, the decomposition or hydrolysis products of alditol acetals not being able to act in this way.

A variety of processes has been suggested for improving the stability, in particular thermal stability, of alditol acetals, in particular dibenzylidene sorbitol and its alkylated or halogenated derivatives, and thus for minimizing or masking, or even suppressing odiferous problems and/or problems of lowering in the effectiveness associated with the use of these products.

These problems may be due in particular to the residual presence, even within the plastics materials, of species which are capable of catalyzing the decomposition of alditol diacetals, such as residual amounts of polymerization catalysts with an acid nature, as described in patent EP 68 773.

The above patent recommends the incorporation, within particular plastics materials (low density linear polyethylenes with a high concentration of residual catalysts), of inhibitors of the decomposition of diacetals selected from a wide variety of chemical families (metal sequestering agents, amines, alkenes, epoxides, cyclic esters, etc).

It has also been proposed, as in patent EP 298 375, to treat the surface of alditol diacetals with metal salts of aliphatic acids or lactic acids with the objective of improving the thermal stability. In the examples in the above patent, 1,3-2,4-di(methylbenzylidene) sorbitol can be stabilized by hot mixing with an equivalent weight of calcium stearate, the mixture obtained being crushed after cooling before being introduced into a polypropylene resin.

Patent EP 361 087 describes the incorporation, into a crystalline polyolefin, of cyclodextrine as a stabilizing agent for dibenzylidene sorbitol or its derivatives.

It has also been recommended that a primary aliphatic amine be incorporated into polypropylene with the objective of reducing the odor generated by the alditol diacetal which it contains, as described in patent JP 4-82890.

Patent EP 522 558 describes the stabilization of dibenzylidene sorbitol and its derivatives by mixing, preferably in a solvent medium (methanol), with 0.05 wt. % to 20 wt. % of sorbic acid and/or potassium sorbate.

Patent JP 9-286788 describes the stabilization of DBS and derivatives by adding polyalcohols, this addition taking place either during the preparative process for alditol diacetal or later by a physical mixing process, in the dry or in the presence of a solvent such as water or an alcohol.

According to the above patent, in particular the examples, the polyol is advantageously introduced in relatively high concentrations, in particular at a concentration of 20% to 150% with respect to the weight of the diacetal.

Moreover, the examples always provide for the use of the polyol in a solvent, in this case isopropanol, in which the diacetal is dispersed, the latter generally being added in the form of a suspension in another solvent, in this case methanol.

The composition of this diacetal is recovered after heating and homogenizing the resulting mixture with the evaporation of any solvent used.

It seems, however, as will be exemplified below, that a composition prepared in this way still has a poor flow behavior and a tacky character. In addition its aerated density is not increased in any case.

Finally, patent EP 569 198 mentioned above, relating to the sorbitol or xylitol diacetals with ultrafine particle sizes, indicates that these types of products reduce the color and odor problems in the final products. This patent is the only one which actually describes the possibility of obtaining, by applying a single process (ultrafine crushing), products which are a priori improved both in terms of "dispersibility" and in terms of "odor".

However, as indicated above, this process involves the use of very specific crushing devices and leads to the production of powdery forms which have a very low density and flow with great difficulty.

OBJECTS AND SUMMARY OF THE INVENTION

Thus there is a need to provide a simple, non-costly and non-dangerous method allowing an improvement in the flow behavior and/or the stability of alditol acetals and which, obviously, does not damage other functional characteristics of these products and does not reduce the range of application, in particular as additives for plastics materials and jellified materials.

The Applicant has found, after a number of research projects, that such a method can comprise adding to said acetals, with certain selected compounds, that s tocopherols and their derivatives, polyols and their non-fatty derivatives and mixtures of these.

To be more specific, the present invention provides a composition of alditol acetal with improved flow behavior and/or improved stability, characterized in that it includes at least one alditol acetal and at least one additive selected from the group comprising tocopherols and their derivatives, and also polyols and their non-fatty derivatives, and that it has an aerated density greater than 250 g/l.

The alditol acetal composition in accordance with the invention can also be characterized in that the alditol acetal and selected additive such as defined above have been subjected in the presence of each other to a shaping and/or densification procedure, in particular granulation, compaction or extrusion.

The improvement in flow behavior of compositions of alditol acetals which can be obtained by using such additives may be recognized in particular by:

a less marked propensity to create domes, or to cause fouling and/or other hindrance, within classical industrial devices for storing, transporting, evacuating, metering or mixing and/or a less marked propensity to generate "fines" or dusts during handling or use.

To this end, the additives mentioned above may act as binding agents or densification agents for alditol acetals.

The improvement in the stability of alditol acetal compositions which may be obtained by using said additives can be recognized in particular by a less marked propensity, during and/or after thermal processing, to emit undesirable odors which can be detected organoleptically and/or by an even more improved transparency of the plastics materials in which said compositions are incorporated.

To this end, the additives mentioned above may also act, with regard to alditol acetals, as stabilizing agents or odor masking agents.

"Alditol acetal" in the context of the present invention is understood to mean in particular alditol diacetals, in particular those resulting from the dehydrocondensation in two positions of an alditol with 5 or 6 carbon atoms and a benzoic aldehyde.

Said alditol may be selected in particular from the group consisting of sorbitol, xylitol, mannitol, ribitol, arabitol and iditol. It may be modified at the level of the last carbon atom in the chain, in particular by introducing a carboxylic group and thus consists of a gluconate or a xylonate.

The benzoic aldehyde used with the objective of preparing alditol acetals which can be used in accordance with the invention may consist in particular of benzaldehyde, 1-naphthaldehyde or of any one of their respective derivatives.

In a preferential manner, the benzoic aldehyde used consists of benzaldehyde or one of its derivatives, for example those derivatives substituted in one or several positions by an alkyl, alkoxyl, hydroxyl, halcen, thioalkyl or sulphoalkyl group.

When the benzaldehyde is substituted in several positions, the substituents may or may not be identical. The substituents may also be linked to form a carbon ring.

In an advantageous manner, the benzaldehyde is substituted in one, two or three positions by an alkyl group, in particular methyl or ethyl, by a halogen group, in particular a chlorinated or fluorinated group, by a hydroxyl group and/or an alkoxyl group, in particular methoxyl. The substitution may be made in particular in positions 2 (ortho), 3 (meta) and/or 4 (para) of benzaldehyde.

The alditol acetal which can be used in accordance with the invention may be selected in particular from those described in European patents EP 286 522 and EP 421 634 and/or in any of the patents described above within the context of the present description.

The alditol acetal is preferably an alditol diacetal selected from the group comprising 1,3-2,4-di(benzylidene) sorbitol (called DBS below), 1,3-2,4-di(benzylidene) xylitol (called DBX below), and their derivatives, in particular alkylated and/or halogenated derivatives, preferably chosen among DBS and its alkylated derivatives.

In a particularly advantageous manner, the alditol diacetal is chosen from among methylated derivatives of DBS, in particular those obtained by dehydrocondensation of sorbitol and a methylated benzaldehyde, with the methyl groups in at least positions 3 or 4 of the ring (meta or para positions respectively).

The methylated derivatives of DBS comprise in particular the following products:

1,3-2,4-di(4-ethylbenzylidene) sorbitol,
1,3-2,4-di(4-methylbenzylidene) sorbitol,
1,3-2,4-di(3-methylbenzylidene) sorbitol, and
1,3-2,4-di(3,4-dimethylbenzylidene) sorbitol.

The additives which can be used in accordance with the invention with the object of improving the flow behavior and/or stability of alditol acetals are, as specified above, selected from among tocopherols and their derivatives, and polyols and their non-fatty derivatives.

"Tocopherols" in the context of the present invention are understood to mean in particular "tocol" or 3,4-dihydro-2-methyl-2(4,8,12-trimethyltridecyl)-2H-1-benzopropane-6-ol and all its derivatives, in particular alkylated derivatives, which may be of natural or synthetic origin.

Alkylated derivatives of tocol may comprise in particular methylated products which are methylated in at least one of positions 5, 7 and/or 8, of the benzopyrane ring in tocol and in particular correspond to α, β, γ and δ tocopherols and mixtures thereof.

In an advantageous manner a natural or synthetic tocopherol made up entirely or in part of α-tocopherol and, in particular, constituted of natural or synthetic vitamin E, is used.

The derivatives of tocopherols may comprise esterified tocopherols, in particular those esterified in position 6 of the benzopyrane ring, which are esterifed by a variety of substituents such as acetate or succinate groups.

"Derivatives of tocopherols" in the context of the present invention are also understood to mean tocotrienol and all its alkylated and/or esterified derivatives. They may be alkylated derivatives such as α, β, γ and δ tocotrienols and mixtures thereof.

The compounds and derivatives previously mentioned are largely described in the literature, for example in:

"The Merck Index", 10th edition, 1983, pp. 1358–1360 and 1437,

"Vitamin E: Biological and Clinical Aspects of Topical Treatment" by K. Furuse, Cosmetics & Toiletries, Vol. 102, Nov. 1987, pp. 99–115, European patent EP 384 472, p.3 lines 45 to 47, these passages being incorporated into the present description.

Polyols which may be used as additives in accordance with the invention are in particular chosen from among the sugar alcohols, glycerol, pentaerythritol and their respective non-fatty derivatives.

"Sugar alcohols" are understood to mean the previously mentioned alditols for preparing alditol acetals, maltitol, isomaltitol, hydrogenated isomaltulose, maltotriitol, hydrolysates of hydrogenated starch, erythritol, lactitol and mixtures thereof.

The non-fatty derivatives of all these products may be produced from them by varying degrees of dehydration, condensation, polymerization, physical modification and/or chemical modification. They may consist for example of isosorbide, isomannide, sorbitan, gluconates, xylonates, dipentaerythritol, phenolic derivatives of pentaerythritol, non-fatty derivatives of glycerol such as ethoxylated derivatives, etc.

In a preferential manner, the polyols which can be used in accordance with the present invention are chosen from among sorbitol, glycerol and pentaerythritol.

According to a first variant, the alditol acetal composition with improved flow behavior and/or improved stability in accordance with the invention is characterized in that it comprises:

50 wt. % to 99 wt. % of alditol acetal(s), and 1 wt. % to 50 wt. % of at least one additive as defined above, these percentages being expressed with reference to the total weight of alditol acetal(s) and additive (s) contained in said composition.

Said composition of alditol acetal advantageously comprises 1 wt. % to 20 wt. %, preferably 3 wt. % to 20 wt. %, of at least one such additive.

The composition of alditol acetal in accordance with the invention may have a number of different solid forms, preferably a powdery and/or granular form and in particular the form of a densified or compacted powder, granules, pellets, pastilles or extrudates.

The powdery forms such as densified or compacted powders may have in particular the form of free-flowing compositions (free-flowing powders) based on particles with variable shape and dimensions and, for example, agglomerates in the form of flakes in which the largest dimension is generally in the range of about 1 mm to about 10 mm and the thickness is less than about 1 mm.

These various solid forms may besides contain other components than the alditol acetal and the additive. When compositions according to the invention are intended for the preparation of plastics materials, they may, for example, contain one or more other constituents chosen from among the additives described in the previously mentioned patents such as, inter alia, antioxidant agents, stabilizers, neutralizers, chelating agents, nucleating agents, clarifying agents, lubricants, anti-UV, antihaze agents, antiblocking agents, antistatic agents, fillers, pigments, phosphites.

The bringing into contact of the alditol acetal and the additive within the composition according to the invention may take place in a variety of manners and in particular by hot or cold mixing, generally followed by one or other of the known methods of granulating, compacting, pelletising or extruding.

The Applicant first found out that the bringing into contact of the alditol acetal and the additive could not merely result, to be efficient, from a simple physical mixing of the two constituents.

The Applicant then discovered, as will be illustrated, that it was advantageous to mix, cold, an alditol acetal such as a methylated derivative of DBS and an additive such as glycerol, sorbitol or pentaerythritol, then to subject the mixture obtained, also cold, to a compacting operation, for example using a roller compactor.

By mixing or compacting "cold", it is to be understood that the operations are performed in the absence of any external source of heat the use of which being intended to increase significantly, directly or indirectly, the temperature of the mixture. Also excluded is any operation which is intended to melt, or solubilize in a solvent, an additive which is in a solid form at ambient temperature.

"Ambient temperature" is generally understood to mean a temperature lower than 30° C., and generally in the range of about 15° C. to about 25° C.

In the context of the invention, the additive is preferably used in the physical state in which it is found at ambient temperature.

This method of operating at ambient temperature minimizes the risks of degradation of the alditol acetal, the energy requirement and the hazards associated with a process which would involve operations such as heating and/or the use of a solvent.

In a particularly advantageous manner, the mixture prepared and compacted "cold" contains an additive which has been used in a solid form, i.e. in a form which is neither liquid nor pasty, and which is kept in this form during the mixing/compacting operations.

In a surprising and unexpected manner, the Applicant found that a solid additive (i.e. not melted nor solubilized in a solvent), amorphous or crystalline, could act, simply by applying pressure, as a binder, and enable the production of alditol acetal compositions which are simultaneously improved with respect to flow behavior, density and dispersibility.

According to the Applicant, the non-molten state of the binder seems to avoid the problems of adherence of the obtained composition to the walls of the containers used for preparing, transporting, crushing, bagging, metering, mixing, storing, etc.

The Applicant has also noticed that by proceeding "cold", in particular at ambient temperature, and by using a solid additive, the crystalline structure of the diacetal contained within the composition is not significantly modified when compared with the crystalline structure of the original diacetal, without an additive.

Conversely, it has noticed that when using a binder in the liquid, solubilized or molten state, this crystalline structure is altered to a greater or lesser extent.

For example, FIG. I represents a scanning electron microscope photograph (SEM—magnification 3 500) of an alditol acetal composition in accordance with the invention, obtained by compacting, on a 3-roll compactor at about 20° C., 1,3-2,4-di(3-methylbenzylidene) sorbitol (called MDBS below) and 10 wt. % of a polyol which is solid at this temperature, in this case sorbltol.

It can be seen that the crystalline structure of the diacetal contained in the composition prepared in this way is not significantly altered since, like the original MDBS and, more generally, like methylated derivatives of DBS, this structure is largely present (i.e. more than 50% of its weight) in the form of rods with a length in the range 5 $\mu$m to 10 $\mu$m and the contours of which are clearly defined. These crystals, like those of the original MDBS, are not oriented in a preferential direction.

FIG. II represents an SEM photograph of an alditol acetal composition also in accordance with the invention, obtained under the same conditions but starting from MDBS and 20 wt. % of a polyol which is liquid at 20° C., in this case glycerol.

In this case the crystalline structure of the MDBS is slightly altered and is in the form of irregular clusters, not preferentially oriented, of rods with contours which are not clearly defined and the majority of which having a length less than 5 $\mu$m.

FIG. III is an SEM photograph of an MDBS composition obtained in the same manner but in which only 10 wt. % of an additive, in this case glycerol monostearate, was added in a molten form and kept in this state during the mixing and shaping operations.

In this case the crystalline structure of the MDBS is greatly altered. A crystalline magma is present, which is more or less continuous, oriented in accordance with a preferential direction and consists of elongated structures which are apparently flexible and with non-defined contours.

Consequently, the present invention also provides a process for improving the flow behavior and/or stability of an alditol acetal characterized in that it includes at least one step during the course of which said aldatol acetal is mixed cold, shaped and/or densified, also cold, and in particular by granulating, compacting or extruding, with at least 1 wt. %, preferably 3 wt. % to 20 wt. %, with respect to the total weight of the mixture, of an additive added and maintained in the solid state, said additive preferably being a stabilizing agent or an odor masker for the alditol acetal.

The present invention also provides, as a new industrial product, an alkylated, preferably methylated, alditol diacetal composition, characterized in that it:
a) flows freely,
b) contains at least one additive which:
  is solid at ambient temperature,
  preferably represents 3 wt. % to 20 wt. % of the total alditol diacetal and additive contained in said composition, and
c) contains an alkylated alditol diacetal most of which is in the form of rod-like crystals with a length in the range 5 $\mu$m to 10 $\mu$m and the contours of which are clearly defined.

The compacting operations, but also the granulating or the pelletising operations in particular, enable the production of alditol diacetal compositions in accordance with the invention with aerated densities greater than 250 g/l, and possibly reaching 700 g/l, in a simple, reproducible and cheap manner.

"Aerated density" is understood to mean the mass per unit volume of a composition which is measured without any tamping down or tapping. This feature is measured by allowing the composition to flow under its own weight into a 100 ml graduated cylinder through a funnel with non-rigid walls (a paper funnel).

Despite densities of this magnitude, the Applicant observed that these compositions of alditol diacetals disperse in a totally satisfactory manner within the materials in which they are introduced and then have, in a surprising manner, an undiminished effectiveness, even an improved effectiveness.

The improved alditol diacetal composition according to the invention is thus also characterized by the fact that it has an aerated density in the range 275 g/l to 700 g/l, preferably in the range 300 g/l to 650 g/l. This density may be in particular in the range 300 g/l to 490 g/l.

To the Applicant's knowledge, a powdery composition of an alkylated alditol diacetal which flows freely and has this type of aerated density, represents a new industrial product, examples of the unexpected advantages of which will be given below.

Furthermore, the present invention also provides a powdery composition of an alkylated, in particular methylated, alditol diacetal which flows freely and has an aerated density greater than 250 g/l, preferably in the range 275 g/l to 700 g/l and in particular in the range 300 g/l to 650 g/l.

In a very advantageous manner, such powdery compositions have an aerated density in the range 300 to 490 g/l.

Alditol diacetal compositions in accordance with the invention may be used in particular in the preparation of plastics materials or jellified materials, but also in the preparation of additives intended for use in such materials.

They may be used in particular, either in the form of powders, for example densified or compacted powders, or in the form of granulates, for the preparation of additives for plastics materials being advantageously in a granular form.

These types of additives may consist in particular of ready-to-use mixtures which are in the form of free-flowing granulates containing in the final state, in addition to the alditol acetal and additive in accordance with the invention, one or more other constituents chosen from the additives described in the patents mentioned above. These types of mixtures are known to the profession by expressions such as "one pack", "custom blend", "pcre-blend" or "no dust blend" mixtures.

"Additives for plastics materials" are understood to mean master mixes (master batches), which have the form of granulates of plastics material, for example polypropylene, in which the additives have been predispersed, entirely or partly, before being eventually incorporated into the final product.

For whatever use the compositions in accordance with the invention are intended, in the future there will be available new methods for improving the flow behavior and/or the stability of an alditol acetal. A process may be characterized in particular in that it includes at least one step during the course of which said alditol acetal is mixed and shaped and/or densified in any manner whatsoever, in particular by granulating or compacting, with at least 1 wt. % with respect to the total weight of mixture, of an additive selected from among tocopherols and their derivatives, polyols and their non-fatty derivatives and any mixtures of these products.

Moreover it follows that the basic concept in the present invention also depends on a process for densifying and/or improving the flow behavior of a composition of preferably alkylated, even more preferably methylated, alditol diacetal, using a stabilizing or odor masking agent for said diacetal, said agent preferably being in the solid state during its use.

MORE DETAILED DESCRIPTION

The invention may be understood better with the aid of the examples which follow and which are given in a purely illustrative manner.

EXAMPLE 1

Preparation of Alditol Acetal Compositions According to the Invention

A commercially available alkylated derivative of DBS, in this case 1,3-2,4-di(4-methylbenzylidene) sorbitol (called MDBS below) in the form of a powder which flows with great difficulty and with a low aerated density (160 g/l), and 11 wt. %, with respect to the weight of alditol diacetal, of one of the following additives in accordance with the invention: glycerol, sorbitol, pentaerythritol and vitamin E, are introduced at ambient temperature into a mixer of the "Robot-Coupe" type.

After mixing for 5 minutes at ambient temperature, each of the compositions thus obtained is subjected to a cold compacting operation in a triple roller compactor of the type used for refining sugar or chocolate.

The resulting compositions have a flow behavior which is very greatly improved and an aerated density which is very significantly increased, that is to say in the order of about 330–340 g/l (obtained with sorbitol or pentaerythritol) to about 370 g/l (obtained with glycerol or vitamin E).

This example demonstrates the importance of the additives selected in the context of the invention as binders or densification agents for alditol acetals.

In a remarkable manner, these additives, even when introduced at relatively low concentrations, enable the preparation of alditol acetal powders which have simultaneously free-flowing behavior and a high aerated density.

They enable in particular the preparation of powders of alkylated derivatives of DBS which flow freely and have aerated densities (very much) greater than 250 g/l. To the knowledge of the Applicant, such a result has never been obtained previously.

EXAMPLE 2

Preparation of Plastics Materials by Using Compositions in Accordance With and not in Accordance With the Invention A master batch based on polypropylene (grade P243L from Borealis) and with 1.1 wt. %, with respect to the polypropylene, respectively of:

either a commercially powder of MDBS with a low aerated density such as that described in example 1, or each of the powders with improved flow behavior in accordance with the invention such as described in example 1, or powders which do not conform to the invention obtained under the same conditions as those described in example 1, by using 11 wt. % (with respect to MDBS) of fatty compounds such as vegetaline, triacetine, stearic acid, lauric acid, Span® 85 or Tween® 80, is first produced in a device of the "Rheocord 90" type fitted with a "Rheomex TW 100" twin-screw extruder operating at a speed of 30 rpm and at a set point temperature of 255° C.

Each of these master blends obtained is introduced into virgin polypropylene at a concentration of incorporation such that the final mixture, which is subjected to a second extrusion cycle, contains 0.2 wt. % of MDBS, with or without an additive.

Each of the plastics materials thus obtained is injection molded at 240° C. in a press of the "All Rounder 200" type, the cooling temperature of the mould being fixed at 17° C.

The injection molded articles obtained were in the form of standardized cylinders of 2 mm thickness.

EXAMPLE 3

Characterizing the Plastics Materials Obtained

For each of the injection molded articles obtained in accordance with example 2, the gain (+) or conversely the loss (−) of transparency, calculated by the difference in the turbidity values (haze) measured using a sample and a control, i.e. in which 0.2% of MDBS alone has been incorporated, was evaluated from values obtained on a "Haze Guard Plus" device.

Sensorial analysis was also used in order to detect the positive, negative or zero effect of the MDBS compositions on the odor of the injection molded plastics material, the control again being a sample into which 0.2% of MDBS without an additive has been incorporated.

This organoleptic test was performed in the following manner. For each tested composition of MDBS, 15 injection molded cylinders were taken which were divided between three air-tight "twist off" glass flasks with a volume of 400 ml, on the basis of 5 cylinders per flask. The cylinders were left for 1 week in the pots at ambient temperature. They were then evaluated "blind" by an expert panel of 15 persons.

Analysis of the evaluations obtained for each tested MDBS composition enabled it to be compared with the control with MDBS which did not contain an additive, in accordance with the following notation:

0: odor equivalent to the control

+: odor less perceptible than that of the control, the number of pluses being proportional to the reduction in the odor problem as compared with the control −: odor more perceptible or more disagreeable than that of the control, the number of minuses being proportional to the increase in the odor compared with the control.

The results of these tests for transparency and odor are summarized below depending on the product used in association with the MDBS.

It is understood that the improvement in the stability of the MDBS may be represented concretely either by the improvement in one only of the two characteristics studied (transparency or odor), this improvement being accompanied at the worst by only a small negative effect on the other characteristic (odor or transparency respectively) or, preferably, by an improvement in both characteristics.

|  | Gain (+)/Loss (−) of % turbidity (haze)/control | Positive (+), negative (−) or nil effect (0) on odor/ (control) |
| --- | --- | --- |
| control = MDBS alone | 0 | 0 |
| MDBS + glycerol* | +18 | ++ |
| MDBS + Sorbitol* | +11 | 0 |
| MDBS + pentaerythritol* | +9 | ++ |
| MDBS + vitamin E* | +4 | + |

-continued

|  | Gain (+)/Loss (−) of % turbidity (haze)/control | Positive (+), negative (−) or nil effect (0) on odor/ (control) |
| --- | --- | --- |
| MDBS + vegetaline | 0 | ---- |
| MDBS + triacetine | −15 | -- |
| MDBS + stearic acid | −15 | -- |
| MDBS + lauric acid | −24 | -- |
| MDBS + Span ® 85 | +19 | --- |
| MDBS + Tween ® 80 | +10 | -- |

*additive used in accordance with the invention.

These results demonstrate that, from among all the products tested, only additives selected in accordance with the invention enable the stability of alditol acetals such as MDBS to be increased, in particular by reducing or masking the detectable undesirable odors they generate, in particular following thermal processing. It is remarkable to note that not only are these types of additives capable of improving both the flow behavior and the stability of alditol acetals in terms of odor but also that this double capacity does not produce any deterioration in the effectiveness of these products and may even increase this effectiveness quite significantly. In the case of glycerol, sorbitol, pentaerythritol and vitamin E, for example, a synergistic effect can be observed in terms of the reduction of haze.

EXAMPLE

Preparing a Composition of MDBS in Accordance With Example 1 of Patent JP 9-286788

In accordance with the method described in example 1 of patent JP 9-286788, 10 g of pentaerythritol are dispersed in 400 ml of isopropanol.

A suspension of 90 g of MDBS in 600 g of methanol is added. The MDBS used is in the form of a powder which does not flow freely and has a low aerated density (148 g/l).

The mixture is heated under reflux with stirring for 30 minutes then evaporated to dryness under vacuum. The product obtained is then crushed.

This product has very poor flow behavior and is tacky. The aerated density is not increased; rather, to the contrary, it is significantly reduced (125 g/l).

I claim:

1. An alditol acetal composition with improved flow behavior and/or improved stability, including at least one alditol acetal and at least one additive selected from the group consisting of tocopherols and their derivatives and polyols and their non-fatty derivatives, and having an aerated density greater than 250 g/l and of at most 700 g/l.

2. A composition according to claim 1, wherein the alditol acetal is an alditol diacetal selected from the group consisting of 1,3-2,4-di(benzylidene) sorbitol (DBS), 1,3-2,4-di(benzylidene) xylitol (DBX) and their derivatives.

3. A composition according to claim 2, wherein the derivatives are alkylated and/or halogenated derivatives.

4. A composition according to claim 2, wherein the alditol acetal is selected from the group consisting of DBS and its alkylated derivatives.

5. A composition according to claim 4, wherein the alditol diacetal is selected from the group consisting of methylated derivatives of DBS.

6. A composition according to claim 5, wherein the alditol diacetal is selected from the group consisting of methylated derivatives of DBS obtained by dehydrocondensation of sorbitol and a benzaldehyde which is methylated in at least position 3 or 4 of its ring.

7. A composition according to claim 1, comprising 50 wt. % to 99 wt. % of alditol acetal(s), and 1 wt. % to 50 wt. % of additive(s), these percentages being expressed with respect to the total weight of alditol acetal(s) and additive(s) contained in said composition.

8. A composition according to claim 7, comprising 1 wt. % to 20 wt. % of additive(s).

9. A composition according to claim 8, comprising 3 wt. % to 20 wt. % of additive(s).

10. A composition according to claim 1, said composition being in a powdery and/or granular form.

11. A composition according to claim 10, said composition being in the form of densified or compacted powder, granules, pellets, pastilles or extrudates.

12. A composition according to claim 1, having an aerated density in the range 275 g/l to 700 g/l.

13. A composition according to claim 12, having an aerated density in the range 300 g/l to 650 g/l.

14. A composition according to claim 13, having an aerated density in the range 300 g/l to 490 g/l.

15. An alditol acetal composition with improved flow behavior and/or improved stability, containing at least one alditol acetal and at least one additive selected from the group consisting of tocopherols and their derivatives and polyols and their non-fatty derivatives, said alditol acetal and said additive being subjected, in the presence of each other, to a shaping and/or densification process.

16. An alditol acetal composition according to claim 15, wherein the shaping and/or densification process is granulation, compaction or extrusion.

17. A composition according to claim 15, wherein the alditol acetal is an alditol diacetal selected from the group consisting of 1,3-2,4-di(benzylidene) sorbitol (DBS), 1,3-2,4-di(benzylidene) xylitol (DBX) and their derivatives.

18. A composition according to claim 17, wherein the derivatives are alkylated and/or halogenated derivatives.

19. A composition according to claim 17, wherein the alditol acetal is selected from the group consisting of DBS and its alkylated derivatives.

20. A composition according to claim 19, wherein the alditol diacetal is selected from the group consisting of methylated derivatives of DBS.

21. A composition according to claim 20, wherein the methylated derivatives of DBS are those obtained by dehydrocondensation of sorbitol and a benzaldehyde which is methylated.

22. A composition according to claim 15, comprising 50 wt. % to 99 wt. % of alditol acetal(s), and 1 wt. % to 50 wt. % of additive(s), these percentages being expressed with respect to the total weight of alditol acetal(s) and additive(s) contained in said composition.

23. A composition according to claim 22, comprising 1 wt. % to 20 wt. % of additive(s).

24. A composition according to claim 23, comprising 3 wt. % to 20 wt. % of additive(s).

25. A composition according to claim 15, said composition being in a powdery and/or granular form.

26. A composition according to claim 25, said composition being in the form of densified or compacted powder, granules, pellets, pastilles or extrudates.

27. A composition according to claim 15, having an aerated density in the range 275 g/l to 700 g/l.

28. A composition according to claim 27, having an aerated density in the range 300 g/l to 650 g/l.

29. A composition according to claim 28, having an aerated density in the range 300 g/l to 490 g/l.

30. Plastics materials or jellified materials comprising a composition according to claim 1.

31. Plastics materials or jellified materials comprising a composition according to claim 15.

* * * * *